US008913542B2

(12) United States Patent
Wu

(10) Patent No.: US 8,913,542 B2
(45) Date of Patent: Dec. 16, 2014

(54) RADIO COMMUNICATION METHOD, SYSTEM AND APPARATUS FOR REUSING CHANNEL RESOURCE

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 13/093,418

(22) Filed: Apr. 25, 2011

(65) Prior Publication Data

US 2011/0199956 A1 Aug. 18, 2011

Related U.S. Application Data

(63) Continuation of application No. PCT/JP2008/003153, filed on Oct. 31, 2008.

(51) Int. Cl.
| | | |
|---|---|---|
| H04B 7/14 | (2006.01) | |
| H04B 7/26 | (2006.01) | |
| H04B 7/155 | (2006.01) | |
| H04W 52/14 | (2009.01) | |
| H04W 52/24 | (2009.01) | |
| H04W 84/04 | (2009.01) | |

(52) U.S. Cl.
CPC .............. *H04B 7/2606* (2013.01); *H04B 7/155* (2013.01); *H04W 52/143* (2013.01); *H04W 52/243* (2013.01); *H04W 84/047* (2013.01)
USPC ................................. 370/315; 370/345; 455/7

(58) Field of Classification Search
None
See application file for complete search history.

(56) References Cited

U.S. PATENT DOCUMENTS

| | | | |
|---|---|---|---|
| 5,596,439 A | 1/1997 | Dankberg et al. | |
| 2003/0104787 A1 | 6/2003 | Blount et al. | |
| 2006/0229017 A1 | 10/2006 | Larsson et al. | |
| 2007/0081483 A1* | 4/2007 | Jang et al. | 370/315 |
| 2008/0049658 A1 | 2/2008 | Asai et al. | |
| 2009/0175214 A1* | 7/2009 | Sfar et al. | 370/315 |
| 2009/0185521 A1* | 7/2009 | Li et al. | 370/315 |

(Continued)

FOREIGN PATENT DOCUMENTS

| | | |
|---|---|---|
| CN | 101136682 | 3/2008 |
| JP | 2006-246002 | 9/2006 |
| WO | 2008/044554 | 4/2008 |

OTHER PUBLICATIONS

First Notification of Office Action issued for corresponding Chinese Patent Application No. 200880131668.2, issued Jun. 5, 2013, with full English translation.

(Continued)

*Primary Examiner* — Mohammad Adhami
(74) *Attorney, Agent, or Firm* — Myers Wolin, LLC

(57) ABSTRACT

A radio communication method includes receiving first data transmitted from a first radio communication apparatus at a second radio communication apparatus and at a third radio communication apparatus 1 being one of third radio communication apparatuses to which the second radio communication apparatus relays data transmitted from the first radio communication apparatus, transmitting second data from the first radio communication apparatus to the third radio communication apparatus 1, and relayed data of the first data from the second radio communication apparatus to a third radio communication apparatus 2 being another one of the third radio communication apparatuses, using a same channel resource, and performing a cancelling process for data in which the second data and the relayed data of the first data are mixed to extract the second data, based on the first data received in the first phase at the third radio communication apparatus 1.

6 Claims, 15 Drawing Sheets

(a) PHASE 1

(b) PHASE 2

(56) References Cited

U.S. PATENT DOCUMENTS

| | | | |
|---|---|---|---|
| 2009/0238185 A1* | 9/2009 | Horn et al. | 370/392 |
| 2009/0254790 A1* | 10/2009 | Pi et al. | 714/749 |
| 2010/0029285 A1 | 2/2010 | Horiuchi et al. | |
| 2011/0211618 A1* | 9/2011 | Oyman et al. | 375/211 |

OTHER PUBLICATIONS

IEEE C802.16m-07/080r3; "Draft IEEE 802.16m Evaluation Methodology Document" IEEE 802.16 Broadband Wireless Access Working Group; Aug. 28, 2007.

802.16j-06/026r4, Air Interface for Fixed and Mobile Broadband Wireless Access Systems: Multihop Relay Specification; Jun. 6, 2007.

Ericsson; "Self backhauling and lower layer relaying" TSG-RAN WG1 #53 bis; R1-082470, Jun. 30-Jul. 4, 2008.

Samsung; "Application of network coding in LTE-advanced relay"; 3GPP TSG RAN WG1 Meeting #53bis; R1-082327; Jun. 30-Jul. 4, 2008.

Panasonic; "Discussion on the various types of Relays"; 3GPP TSG RAN WG1 Meeting #54; R1-082397; Jun. 30-Jul. 4, 2008.

LG Electronics; "Consideration on Relaying Frame Structure Design in LTE-A FDD Mode"; R1-082944; Aug. 18-22, 2008.

Panasonic; "Discussion on the TD relay and FD relay for FDD system"; 3GPP TSG RAN WG1 Meeting #54; R1-083002; Aug. 18-22, 2008.

Qualcomm Europe; "Operation of relays in LTE-A" 3GPP TSG-RAN WG1 #54; R1-083191; Aug. 18-Aug. 22, 2008.

China Mobile, Vodafone, Huawei; "Application Scenarios for LTE-Advanced Relay" TSG-RAN WG1 #54; R1-082975; Aug. 18-22, 2008.

3GPP TR 25.814 V7.0.0 (Jun. 2006); 3rd Generation Partnership Project; Technical Specification Group Radio Access Network; "Physical layer aspects for evolved Universal Terrestrial Radio Access (UTRA)"; (Release 7); Jun. 2006.

Extended European search report, the supplementary report and the written opinion issued for corresponding European Application No. 08877690.1 dated Apr. 4, 2012.

* cited by examiner

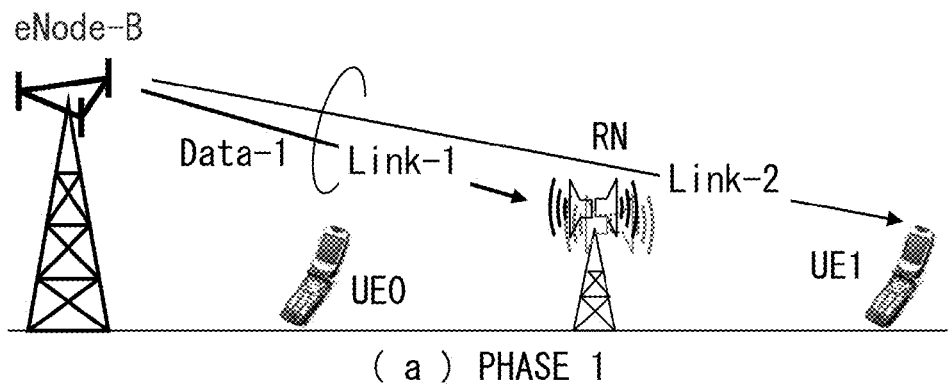
(a) PHASE 1
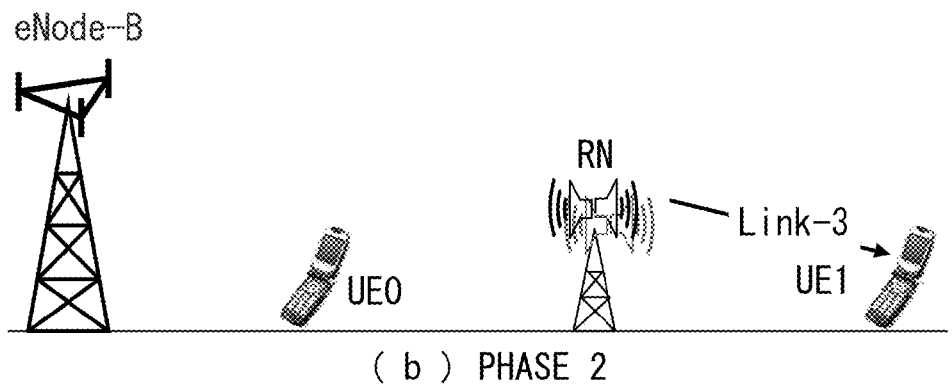
(b) PHASE 2
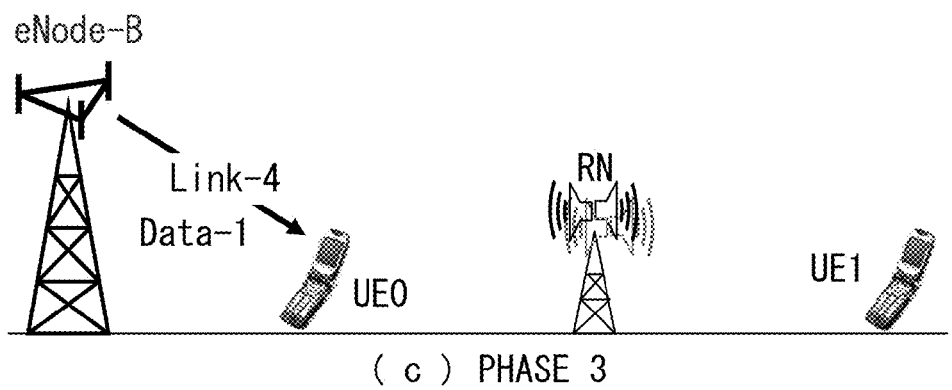
(c) PHASE 3
F I G. 1

(a) PHASE 1

(b) PHASE 2

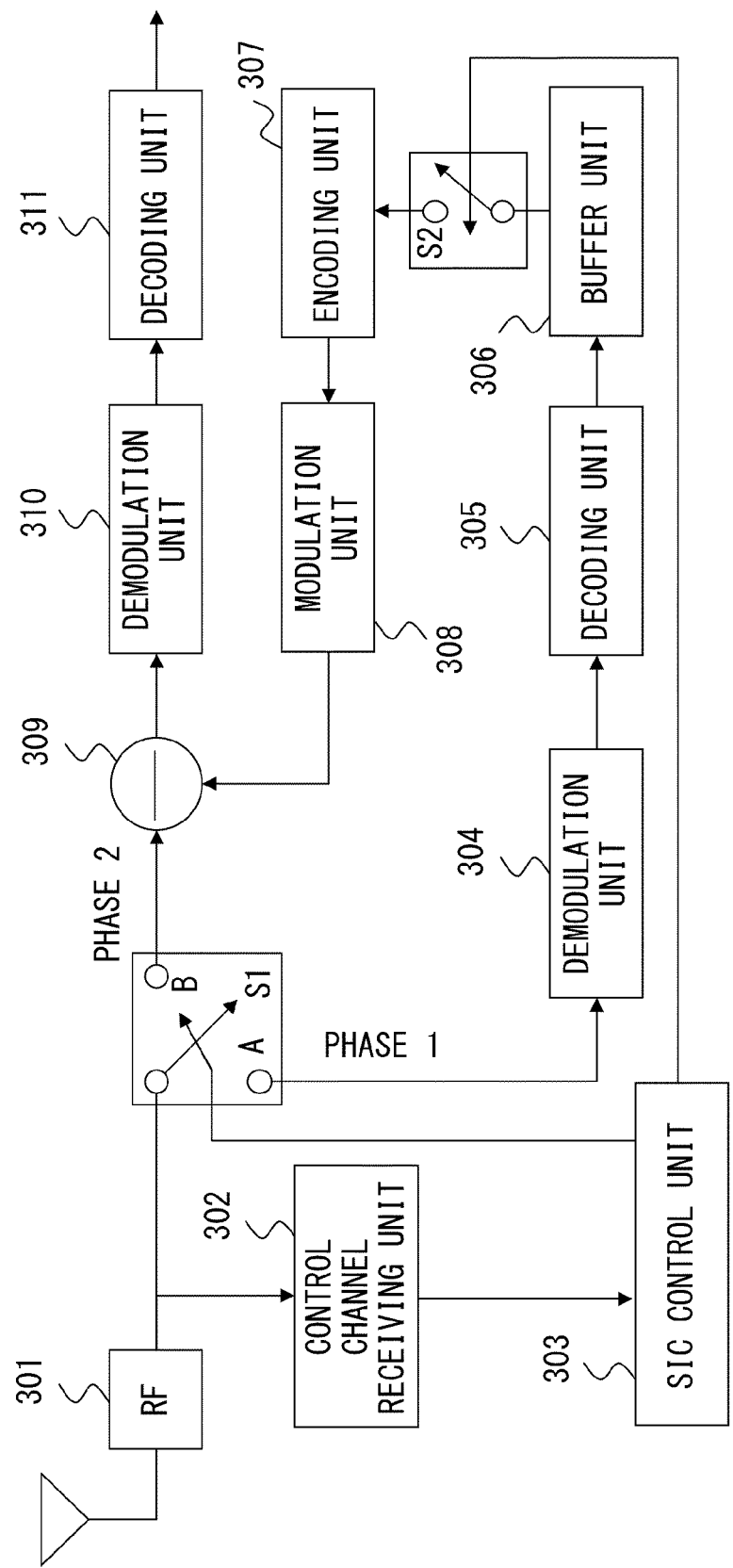
F I G. 3

(a) CONVENTIONAL SYSTEM (b) PRESENT EMBODIMENT SYSTEM

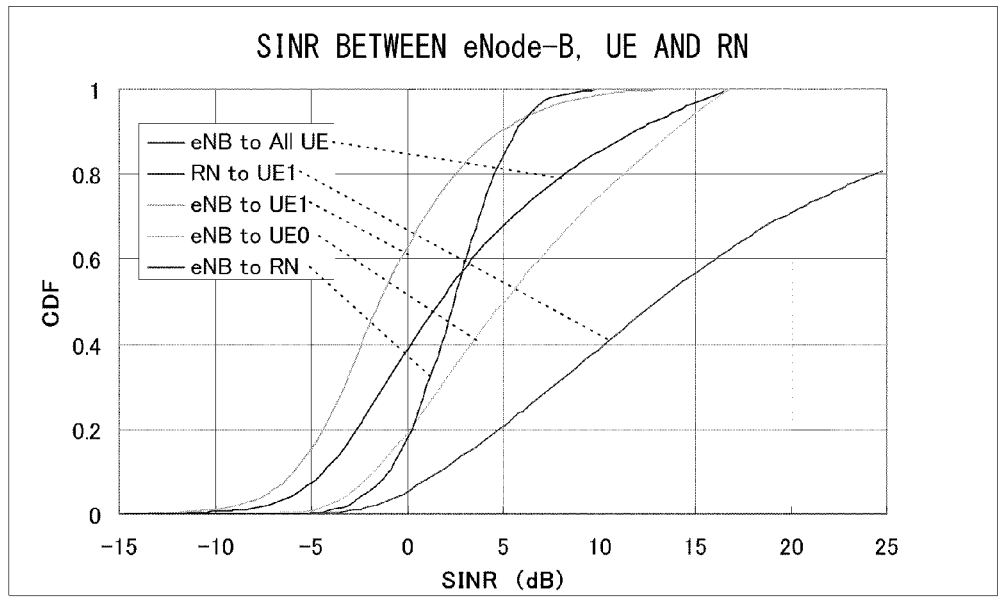
F I G. 9

| Parameter | Value |
|---|---|
| Number of Clusters | 7 |
| Number of Cells in each Cluster | 19 |
| Number of RNs in each cell | 3 |
| Inter-site Distance | 2 km |
| Distance between eNB and RN | 1 km |

F I G. 1 3

| Parameter | Value |
|---|---|
| Carrier Frequency | 2.0 GHz |
| Frequency Bandwidth | 10 MHz |
| Minimum Distance between eNB/UE | 35 m |
| eNB Transmission Power | 46 dBm |
| eNB Antenna Gain | 14 dBi |
| eNB Noise Figure | 5 dB |
| eNB Antenna Patteren | 70 degrees beam-width |
| RN Transmission Power | 37 dBm |
| RN Antenna Gain | 5 dBi |
| RN Noise Figure | 7 dB |
| RN Thermal Noise Density | −174 dBm/Hz |
| RN Other Loss | 5 dB |
| RN Antenna Pattern | Omni-Directional |
| UE Antenna Gain | 0 dBi |
| UE Noise Figure | 9 dB |
| UE Thermal Noise Density | −174 dBm/Hz |
| UE Other Loss | 20 dB |
| UE Antenna Pattern | Omni-Directional |

F I G. 1 4

| Parameter | Value | Description |
|---|---|---|
| Pathloss for eNB-UE | 128.1+37.6log10(d) | d in km |
| Standard Factor for eNB-UE | 8.0 dB | Standard Deviation |
| Correlation for eNB-UE | 0.5 | Correlation between eNBs Received by UE |
| Pathloss for eNB-UE for ART | 105.1+40.7log10(d) | d in km, 15 meters for Antenna Height |
| Standard Factor for eNB-RN (ART) | 3.4 dB | Standard Deviation |
| Correlation for eNB-RN (ART) | 0.5 | Correlation between RNs Received by eNB |
| Pathloss for RN-UE | 128.9+50.4log10(d) | d in km, 3 meters for Antenna Height |
| Standard Factor for RN-UE | 8.2 dB | Standard Deviation |
| Correlation for RN-UE | 0.5 | Correlation between RNs Received by UE |

F I G. 1 5

RADIO COMMUNICATION METHOD, SYSTEM AND APPARATUS FOR REUSING CHANNEL RESOURCE

CROSS-REFERENCE TO RELATED APPLICATION

This application is a continuation of PCT application PCT/JP2008/003153, which was filed on Oct. 31, 2008, now pending, the contents of which are herein wholly incorporated by reference.

FIELD

Embodiments described herein relate to a radio relay communication technology.

BACKGROUND

In a radio communication system, in a noise dominant network or a dead-spot, in general, a relay node may need to be involved, which aims at resolving the coverage problem. The relay system has already been adopted, as described in Non-Patent Document 1 below, in IEEE (The Institute of Electrical and Electronic Engineers) 802.16j standard. In addition, the relay system will be potentially developed also in new cellular phone standards such as long-term evolution advanced (LTE-advanced) for which standardization works have been in progress by the standardization body 3GGP (3rd Generation Partnership Project). Details of these are described, for example, in Non-Patent Documents 2-8 below.

Non-Patent Document 1

802.16j-06/026r4, Air Interface for Fixed and Mobile Broadband Wireless Access Systems Multihop Relay Specification, 2007-06-06.

Non-Patent Document 2

Ericsson, "Self backhauling and lower layer relaying", R1-082470, Jun. 30-Jul. 4, 2008.

Non-patent Document 3

Samsung, "Application of network coding in LTE-advanced relay", R1-082327, Jun. 30-Jul. 4, 2008.

Non-Patent Document 4

Panasonic, "Evaluation Methodologies for the SLS with Relay", R1-082397, Jun. 30-Jul. 4, 2008.

Non-Patent Document 5

LG Electronics, "Consideration on relaying frame structure design in LTE-A FDD mode", R1-082944, Aug. 18-22, 2008.

Non-patent Document 6

Panasonic, "Discussion on the TD relay and FD relay for FDD system", R1-083002, Aug. 18-22, 2008.

Non-Patent Document 7

Qualcomm Europe, "Operation of relays in LTE-A", R1-083191, Aug. 18-22, 2008.

Non-Patent Document 8

China Mobile, Vodafone, and Huawei, "Application Scenarios for LTE-Advanced Relay", R1-082975, Aug. 18-22, 2008.

SUMMARY

According to an aspect of the embodiments discussed herein, 1. a radio communication method includes receiving, in a first phase, first data transmitted from a first radio communication apparatus at a second radio communication apparatus and at a third radio communication apparatus 1 being one of third radio communication apparatuses to which the second radio communication apparatus relays data transmitted from the first radio communication apparatus, transmitting, in a second phase, second data from the first radio communication apparatus to the third radio communication apparatus 1, and relayed data of the first data from the second radio communication apparatus to a third radio communication apparatus 2 being another one of the third radio communication apparatuses, using a same channel resource, and performing, in the second phase, a cancelling process for data in which the second data and the relayed data of the first data are mixed to extract the second data, based on the first data received in the first phase at the third radio communication apparatus 1.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing summary description and the following detailed description are exemplary and explanatory and are not restrictive of the embodiments, as claimed.

BRIEF DESCRIPTION OF DRAWINGS

FIG. 1 is a diagram illustrating an L2 relay system.
FIG. 3 is a diagram illustrating the configuration of a receiver of a UE according to the embodiment.
FIG. 9 is a diagram illustrating an example of CDF of geometry (long-term SINR) for links from eNode-B to UE, from RN to eNode-B, and RN to UE.

FIG. 13 is a table illustrating an example of System parameters for cell and network structure.

FIG. 14 is a table illustrating an example of system level assumptions.

FIG. 15 is a table illustrating an example of pathloss and shadowing for links of eNB-UE, eNB-RN, and RN-UE.

DESCRIPTION OF EMBODIMENTS

Figure 2:
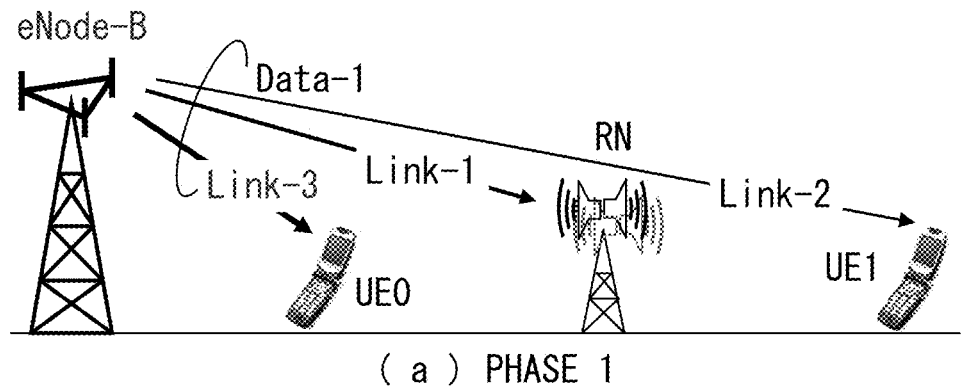
FIG. 2 is a diagram illustrating the system configuration of a relay system with channel resource reuse according to the embodiment.
Figure 2:
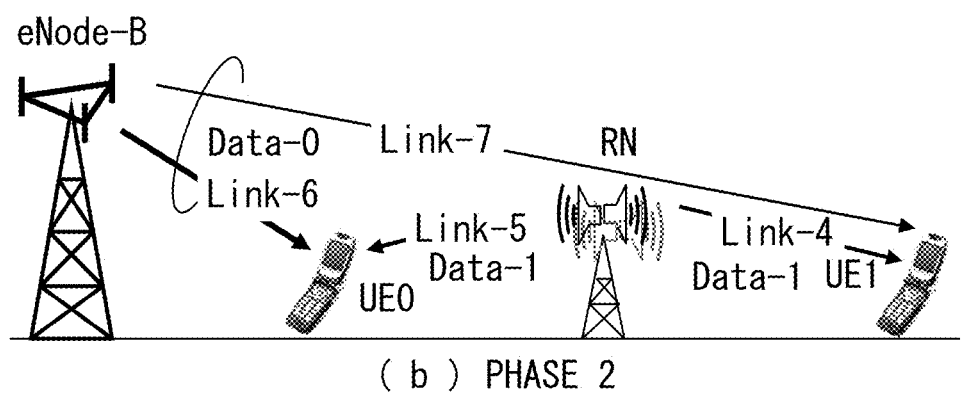

Embodiments are described in detail below with reference to the drawings.

Regarding the embodiments discussed herein, the following observations are made.

The relaying node may be applied with different purposes. In rural area the relay aims to improve the cell coverage. In urban hot spot the relay aims to achieve higher spectrum efficiency. In dead spot the relay aims to resolve the coverage problem for users in coverage holes. For example, the relaying system may categorized to three types related to L1, L2, and L3 relay with different function, requiring various complexities in terms of control channel, data processing, and high layer interface.

L1 relay, as a simple solution, only amplifies and forwards the received signal from source in physical layer. Such a type of relay, sometimes considered as an advanced repeater with measurable, controllable and power control functionality, aims to enhance the received data power by only introducing a negligible delay as opposed to L2 and L3 relay. However, the drawback is that the noise component is also enlarged by the relaying process.

L2 relay contains some fundamental functions, enabling to decode and re-encode the received data blocks from source and then forward layer-2 signal to the target. In this relaying, the decoded data blocks may be precisely processed, and no noise is enhanced by the relay node. Link adaptation may be performed individually for each hop which gives a more efficient link with high reliability for resource utilization. In addition, ratio resource management (RRM) technologies may be implemented in the L2 relay which is able to provide benefits in terms of higher throughput and larger coverage. Some modification of the radio protocol medium access control (MAC), and radio resource control (RRC) radio link control (RLC) may be required.

The L3 relay node forwards the user-plane traffic data using the internet protocol (IP) layer. The L3 relay does not require significant modification of the radio protocol because it offers the transmission functionality through S1 and X2 interface, although some enhancements could be adopted to achieve higher throughput. To achieve L3 relay, it is to require more cost-efficient backhauling and the higher overhead as compared to L2 relay due to header packing and re-packing. However, the resource utilization of L3 relay could be less than that of L2 relay. One big concern is that the throughput of the backhaul link may become a bottleneck for the whole system capacity.

In this contribution, the focus of our discussion is on the L2 relay, and the main intention is to improve the link efficiency such as achievable overall system throughput and user coverage. The relay system, in general, utilizes the independent channel for each link with the orthogonal property in order to avoid the interference between the links. This means that the necessary amount of channel resource is proportional to the number of relay hops. With two-hop relaying, for instance, twice orthogonal channel resources have to be utilized.

FIG. 1 is a diagram presenting an example of an L2 relay system. For network model explanation, without loss of generality, we simply assume that the network contains one radio station (hereinafter, referred to as "eNode-B"), one relay node (hereinafter, referred to as "RN"), and two user equipments (UE) represented as UE0 and UE1 to which both the eNode-B and RN provide services. We further assume that UE-0 is physically closer to the eNode-B whereas UE-1, to certain extent, is far away from the eNode-B resulting in a large propagation loss. Thus, the link performance between eNode-B and UE-1 needs to be improved by alternatively using relaying mechanism. In such a cellular environment, the eNode-B performs 1-hop DL transmission with one phase protocol for UE0 while the RN performs 2-hop relaying transmission with two phase protocol for UE1 in consideration of in-band relaying operation.

In what follows, we introduce a terminology denoted Link-$\chi$ ($\Psi$=1, 2 . . . ) that is defined as data channel delivering only one data packet which could be received by either single or multiple receivers.

In FIG. 1, in the phase-1, the data packet (denoted data-1) is delivered from eNode-B to RN using Link-1, which meanwhile is received by UE1 on Link-2 as an enhanced signal for relay combining. However, this signal is a very weak signal with a low reliability.

In the phase-2, RN decodes the packet and encodes it again. The resultant newly formed data packet (denoted data-1) with exactly the same MCS is transmitted by RN to UE1, using Link-3. The MCS of the data-1 could be a different MCS based on channel realization. At the UE1 receiver, either minimum mean square error (MMSE) or maximal ratio combining (MRC) may efficiently collect all the desired signals and then decodes the data packet.

In the phase-3, the new data packet (denoted data-0) is delivered from eNode-B to UE0 using Link-4.

As presented in FIG. 1 described above, in the conventional L2 relay system, at least three channel resources are required to enable the three links from the eNode-B to the RN, from the RN to the UE, and from the eNode-B directly to the UE to communicate respectively without being mixed up. Naturally, in an actual L2 relay system, a significantly large number of channel resources are required to handle a large number of eNode-Bs, a large number of RNs and a significantly large number of UEs.

It is a significant challenge to reduce channel resources even a little, also for the purpose of using frequency bands effectively.

In the embodiment, a radio communication network including eNode-B (first radio communication apparatus), RN (second radio communication apparatus) and UE0 (third radio communication apparatus (1)) and UE1 (third radio communication apparatus (2)) is configured.

The focus of the embodiment is on the L2 relaying. In the relay network, there exists a unique property that the UE served by RN receives less signal power including interference from eNode-Bs, since the UE is located far from the eNode-B. According to this valuable property, a hint may be given that RN and eNode-B may transmit the multiple signals simultaneously by reusing the same frequency band, targeting different users. As a consequence, the RN serves the cell edge user, while the eNode-B serves the cell center user. This may aim to reduce the channel resource uses and efficiently achieve the same number of links in a relay involved network.

In addition, at the UE side, the link quality may be further enhanced by successive interference cancellation (SIC). For example, the first UE served by the eNode-B may receive and decode even the first packet transmitted from the eNode-B to the RN in the phase-1. Next, it is assumed that at the timing of the phase-2 in which the RN attempts to transmit a relayed packet generated by decoding and re-encoding the first packet to the second UE located at a distance from the eNode-B, the first UE receives a new second packet using the channel resource that the relayed packet use. The reception of the second packet is performed in the phase-3. In this assumption, the first UE receives the second packet from the eNode-B and the relayed packet transmitted from the RN to the second UE via the same channel resource simultaneously. In this case, the first UE may cancel the relayed packet received from the RN by the first packet received, decoded and held in advance in the phase-1, and extract only the second packet from the eNode-B precisely. This means that two phases (that is, two channel resources), instead of three phases (that is, three channel resources), are required in order to deliver a packet to the UE that uses relay and the UE that does not use relay without mixing up. This is the basic operation of the embodiment.

Throughout this article, we only consider a single input and multiple input (SIMO) scenario with frequency division duplex (FDD) structure although the multiple input and multiple input (MIMO) and time division duplex (TDD) also work well. In what follows, we start to describe the network model, and detail the channel resource reuse based relay. In addition, configuration of the UE, the frame structure, power control, and some related control channel design are elaborately studied. To evaluate the system performance, a system level based simulation is performed to justify the behavior with solid data evidences.

FIG. 2 is a diagram presenting the system configuration of a relay system with channel resource reuse according to the embodiment. In the embodiment, we consider two phase protocol for data packet transmissions, as illustrated in FIG. 2. It should be noted that all links in each phase could be assumed to be either a SIMO or a MIMO link.

In the phase-1 (first transmission phase), the data packet (denoted Data-1) is delivered from eNode-B to RN using Link-1. The Data-1 is received by both UE0 and UE1 on Link-3 and Link-2, respectively. The link qualities received by UE0 and UE1 are completely different; the former (Link-3) is much better than the latter (Link-2). What is the most important thing for this phase is that the transmitted Data-1 packet is surely succeeded by both RN and UE0. That is, the RN processes the Data-1 packet for relaying, and the UE0 processes the Data-1 packet for SIC in the following phase-2.

In addition, the eNode-B determines the MCS for Data-1 by choosing the worse MCS between Link-1 established with the RN and Link-3 established with the UE0.

In the phase-2 (second transmission phase), the RN decodes the packet and encodes it again. The resultant newly formed data packet (denoted data-1) with exactly the same MCS is transmitted by RN to UE1 on Link-4. The MCS of the Data-1 could be a different MCS based on channel realization. The Data-1 relayed packet is also received by the UE0 simultaneously (Link-5).

Meanwhile, in the phase-2, the eNode-B reuses the same channel resource as the channel resource in the Link-4 to deliver a new data packet (presented as Data-0) (second data) to the UE0 (Link-6). This Data-0 packet is received also by the UE1 as a very weak signal (Link-7).

At the receiver of the UE1, the MMSE may collect all the desired signals (signals from Link-2 and Link-4), and receives the Data-1 relayed packet from the RN while efficiently suppressing the interference from the eNode-B.

Meanwhile, about the Data-0 packet (Link-6) from the eNode-B and the Data-1 packet (Link-5) from the RN received on the same channel resource, the receiver of the UE0 performs a cancelling process (SIC process), in the phase 2, of the component of the Data-1 packet by the Data-1 packet component received and decoded in the phase 1 and kept, to extract only the Data-0 packet precisely.

By the control process above, for each relaying circle, two phases (that is two channel resources), instead of three phases (that is three channel resources), are required in order to deliver a packet to the UE using relaying and the UE not using relaying without mixing up. The number of the channel resources is the same as the number what a transmitter does without relaying.

Here, we attempt to formulate the received signal for UE1 in consideration of the received signal combining. The intention is to clarify the impact if the same channel resource is frequency reused on Link-4 and Link-7 in FIG. 2.

It is assumed that the UE1 has two receive antennas, and the received signal in phase 1 and phase 2 are denoted $\underline{y}_1(k)$ and $\underline{y}_2(k)$ respectively, these are given as the following expressions.

$$\underline{y}_1(k)=\underline{\Gamma}_2 x_1(k)+\underline{n}_1(k) \quad \text{(Equation 1)}$$

$$\underline{y}_2(k)=\underline{\Gamma}_4 x_1(k)+\underline{\Gamma}_7 x_2(k)+\underline{n}_2(k) \quad \text{(Equation 2)}$$

where $x_i(k)$ a data symbol, and $\underline{n}_i(k)$ is additive white Gaussian noise (AWGN) plus interference with standard deviation $\sigma_i$ (i=1, 2). $\underline{\Gamma}_2$, $\underline{\Gamma}_4$ and $\underline{\Gamma}_7$, represent channel responses for Link-2, Link-4 and the Link-7. $\underline{\Gamma}_l$ is represented as $$\underline{\Gamma}_l = \begin{bmatrix} \Gamma_{l,1} \\ \Gamma_{l,2} \end{bmatrix} \quad \text{(Equation 3)}$$

$$\underline{n}_i(k) = \begin{bmatrix} n_{i,1}(k) \\ n_{i,2}(k) \end{bmatrix} \quad \text{(Equation 4)}$$

The equation 1 may easily be modified to $$\underline{y}_1(k)=\underline{\Gamma}_4 x_1(k)\underline{n}_1'(k) \quad \text{(Equation 5)}$$

where $\underline{n}_1'(k)$ is defined as $$\underline{n}'_i(k) = \begin{bmatrix} n_{1,1}(k) \cdot \dfrac{\Gamma_{4,1}}{\Gamma_{2,1}} \\ n_{1,2}(k) \cdot \dfrac{\Gamma_{4,2}}{\Gamma_{2,2}} \end{bmatrix} \quad \text{(Equation 6)}$$

If we assume that $$\dfrac{\Gamma_{4,k}}{\Gamma_{2,k}} = a_k + jb_k \quad \text{(Equation 7)}$$

the standard deviation of $\underline{n}_1'(k)$, $\sigma_1'$ may be expressed as $$\sigma_1' = \left(\frac{\sqrt{a_1^2 + b_1^2} + \sqrt{a_2^2 + b_2^2}}{2}\right)\sigma_1 \quad \text{(Equation 8)}$$

Prior to combining the equation 2 and the equation 5 to enhance the desired signal $x_1(k)$, it needs to weight a factor to the equation 5 in order to have the effect of maximum ratio combining. The weighting factor $\alpha$ is defined as follows.

$$\alpha = \left(\frac{\sigma_2}{\sigma_1'}\right)^2 \quad \text{(Equation 9)}$$

The resultant combined signal may be expressed as follows.

$$\underline{y}_2'(k) = \underline{\Gamma}_4(1+\alpha)x_1(k) + \underline{\Gamma}_7 x_2(k) + \underline{n}_2'(k) \quad \text{(Equation 10)}$$

where the standard deviation of $\underline{n}_2'(k)$ is defined as follows.

$$\sigma_2' = \sqrt{(\sigma_2)^2 + (\alpha\sigma_1')^2} = \sqrt{(\sigma_2)^2 + \left(\frac{\sigma_2^2}{\sigma_1'}\right)^2} \quad \text{(Equation 11)}$$

Accordingly, the equation 10 may be expressed in matrix form as follows.

$$\begin{bmatrix} y_{2,1}'(k) \\ y_{2,2}'(k) \end{bmatrix} = \begin{bmatrix} \Gamma_{4,1}(1+\alpha) & \Gamma_{7,1} \\ \Gamma_{4,2}(1+\alpha) & \Gamma_{7,2} \end{bmatrix} \begin{bmatrix} x_1(k) \\ x_2(k) \end{bmatrix} + \begin{bmatrix} n_{2,1}'(k) \\ n_{2,2}'(k) \end{bmatrix} \quad \text{(Equation 12)}$$

The MMSE may decode the desired signal $x_1(k)$ and suppress the interference $x_2(k)$.

The configuration of a receiver of RN according to the embodiment may be similar to a general configuration of a receiver of RN. The receiver of the UE with the proposed relaying scheme according to the embodiment may have more functions other than the general relaying, mainly involving a SIC mechanism.

The configuration of the receiver of the UE according to the embodiment is presented in FIG. 3.

From the received signal received by an RF (Radio Frequency) unit 301 via an antenna, a control channel receiving unit 302 first extracts the control channel specifying phase-1 or phase-2.

An SIC control unit 303 determines whether phase-1 signal has been received or phase-2 signal has been received.

If the phase-1 signal has been received, the SIC control unit 303 turns on point A in the switch S1. As a result, the phase-1 signal is demodulated in a demodulation unit 304, and decoded in a decoding unit 305. The resultant data is kept in a buffer unit 306 for the cancelling process.

If the phase-2 signal has been received, the SIC control unit 303 turns on the switch S2 to output the decoded data in phase-1 kept in the buffer unit 306. The decoded data in phase 1 output from the buffer unit 306 is re-encoded in an encoding unit 307 and re-modulated in a modulated unit 308, to generate a packet signal for the SIC process with appropriate MCS level.

The SIC control unit 303 turns on point B in the switch S1 at the timing when the SIC process is ready. As a result, for the received signal, the cancelling process (SIC process) of an interference signal (corresponding to the Data-1 in FIG. 2) is performed in a canceller unit 309, and only a component that is originally supposed to be received (corresponding to the Data-0 in FIG. 2) is extracted. This signal is demodulated in a demodulation unit 310 and decoded in a decoding unit 311, and output for the signal processing in the subsequent stage.

Next, the frame configuration in the relay communication system in the embodiment is explained.

A DL (downlink) frame structure is explained relaying on FDD system. The scheme in the embodiment also works well for a TDD system. The frame structure relying on FDD is designed for links between eNode-B, RN, and UE.

Figure 4:
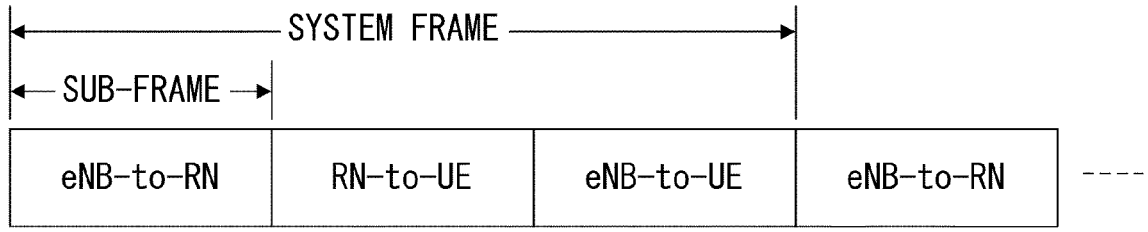
FIG. 4 is a diagram illustrating a configuration example of a system frame according to the embodiment.
Figure 4:
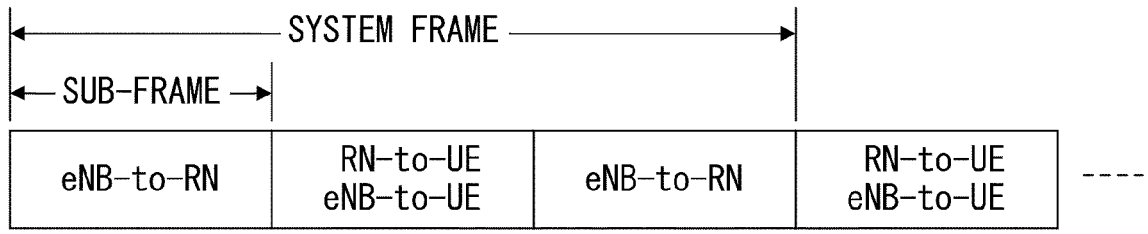

We consider a DL frame structure formed by a system frame which is defined as a transmission window repeated. In conventional relay system as illustrated in FIG. 4(a), the system frame contains three sub-frames corresponding to three phases denoted as eNB-to-RN, RN-to-UE, and eNB-to-UE using the orthogonal channels from each other. Here, eNB-to-RN represents the control channel directing from the eNode-B to the RN. RN-to-UE represents the control channel directing from the RN to the UE. eNB-to-UE presents the control channel directing from the RN to the UE.

Meanwhile, in the relay system of the embodiment, as presented in FIG. 4(b), the system frame contains two sub-frames corresponding to two phases denoted eNB-to-RN and RN-to-UE/eNB-to-UE using the orthogonal channels from each other as well. RN-to-UE/eNB-to-UE indicates that the control channel directing from the RN to the UE and the control channel directing from the eNode-B to the UE are mapped on the same channel resource.

In the conventional relay scheme, three sub-frames play the different role in the data transmission. In the first sub-frame, eNode-B delivers the data to RN, in the second sub-frame then, RN forwards the decoded data packet to the corresponding UE, and in the third sub-frame finally, eNode-B transmits the data packet to the serving UE with the direct link where no RN is involved.

In the relay scheme according to the embodiment, the number of sub-frames, which is channel resource, is reduced to two, that may offer higher transmit efficiency. That is, in the first sub-frame, similarly, eNode-B delivers the data to RN. In the second sub-frame, a simultaneous transmission is taken into account, that both eNode-B and RN transmit their own data packet to their individual serving UE. As a result, a significant effect due to reuse of the frequency is obtained.

In the relaying of the embodiment, UE1 receives the desired signal from RN, as well as the interference from eNode-B. In general, the transmission power from eNode-B is much larger than that from RN. This could result in a notable impact to UE1. To mitigate such impact by reducing the interference to UE1, eNode-B which provides Link-3 may be power controlled or properly power allocated.

It is worthwhile noting that if the cell is not configured to perform the simultaneous transmission with a frequency reuse mechanism, the power should not be down controlled. The power is only down controlled in the frequency reused cell of the embodiment. The control amount is determined based on the factors such as interference impact and achievable MCS level.

Next, the control channel design in the relay system of the embodiment is explained. In order to accomplish the proposed relaying of the embodiment with a simultaneous data transmission in the same resource channel, some additional control channels are required.

In Link-1, besides data packet, eNode-B transmits control signal in control channel, which contains the RN ID and UE ID. The RN IN is identification information for identifying an RN from a plurality of RNs. The UE ID is identification information for identifying a UE from a plurality of UEs. All UEs and RNs decode the control signal but only RN and UE who corresponds to the indicated RN ID and UE ID decode the data packet. The decoded data packet is used for SIC purpose in next coming sub-frame.

Figure 5:
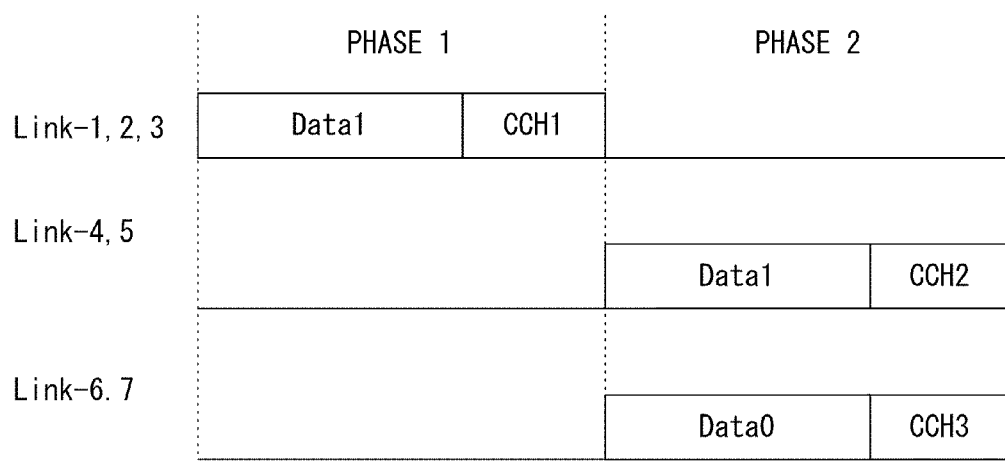
FIG. 5 is a diagram illustrating an example of transmission timing according to the embodiment.

FIG. 5 exemplifies the transmission timing between two phases in relaying scheme. The contents in control channel of CCH1, CCH2, and CCH3 are different, and may be categorized as follows:

>> CCH1: MCS, channel resource indication, receive RN ID, receive UE0 ID, receive UE1 ID, and others.

>> CCH2: MCS, channel resource indication, receive UE1 ID, and others.

>> CCH3: MCS, channel resource indication, receive UE0 ID, and others.

To evaluate the performance of the relay system of the embodiment by compared to the conventional relay system, a system level simulation is taken into account. We first describe the cell layout including the locations of eNode-B and RN, and the UE distribution. Thereafter, we give the detailed parameters such as transmission power and path-loss model. Then some system level based simulation results with some intuitive description are described.

Figure 6:
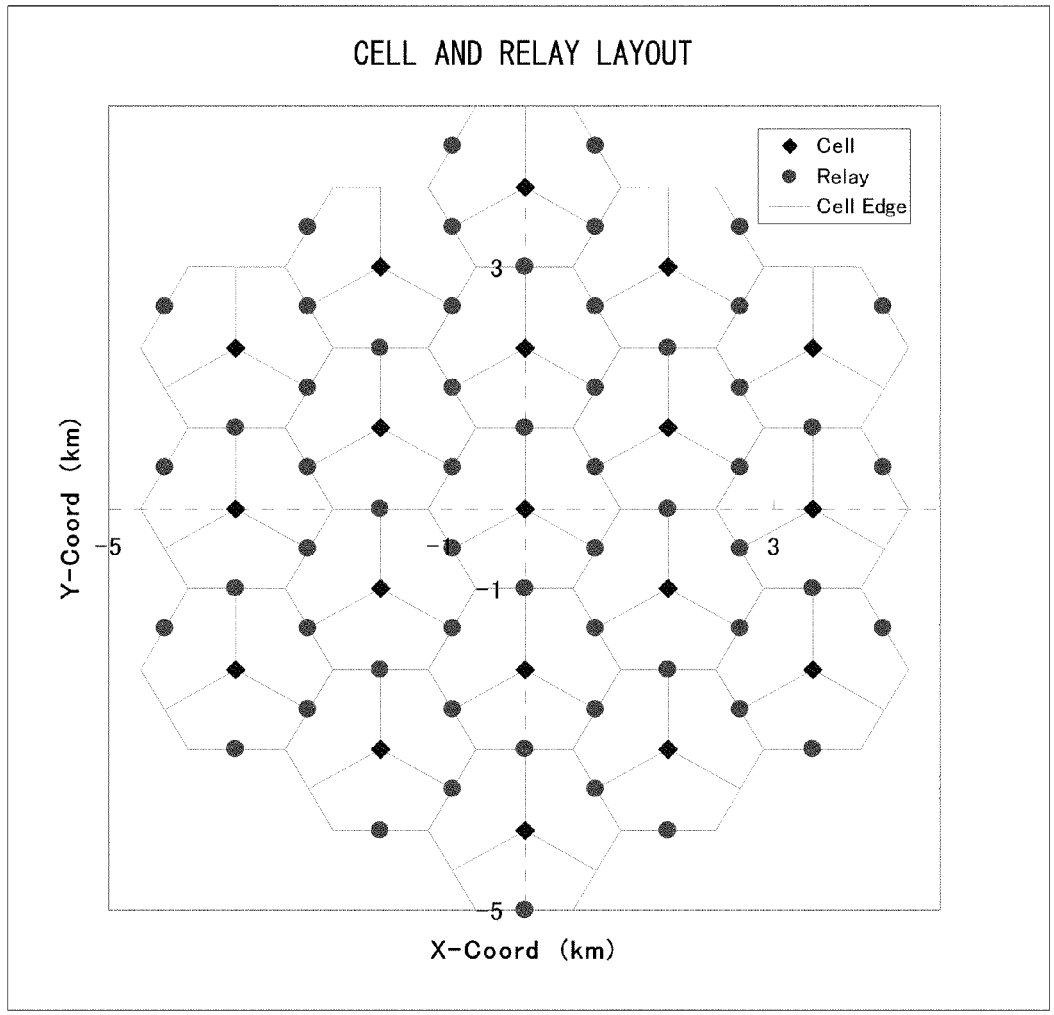
FIG. 6 is a diagram illustrating an example of a cell and a relay station layout in a class.

First, the cell layout and UE distribution are explained. The system level simulation is implemented in a cell network formed with 7 clusters. Each cluster consists of 19 hexagonal cells and each cell contains 3 sectors. Each RN is located in the boundary of the sector, and thus, three RNs in total work for one cell. The antenna of the sector is orientated with bore-sight point to the side of hexagon, and each RN with omni-directional antenna is located in the centre of each sector. The correspondence of those eNode-Bs and RNs is illustrated in FIG. 6. In FIG. 6, a rhombic plot and a circular plot represent eNode-B and RN, respectively. The system parameters are listed in Table of FIG. 13.

To accurately model interferences incident from outer-cells, a wrap around network structure with 7 copies of the centre hexagonal cluster is employed, where the original cluster is placed in the middle and 6 copies are attached on the side symmetrically.

With this network structure, we attempt to calculate the link budget so called geometry. The geometry is defined as a long-term signal-to-interference and noise ratio (SINR), which is the ratio of the desired signal power to the total received interference plus additional white Gaussian noise (AWGN). Table in FIG. 14 gives detailed system level assumptions.

In the system level simulation, the focus is on three links; they are from eNode-B to UE1 (served by RN), from RN to UE1, and from eNode-B to UE0 (served by eNode-B), respectively. The corresponding path-loss and shadowing are listed in Table of FIG. 15.

Regarding the Pathloss for eNB-UE for ART in Table of FIG. 15, for the pathloss model used between RN and eNode-B, a type D with line-of-side (LOS) is exploited, where RN and eNode-B antennas are all located above roof top described, for example, in Non-Patent Document 9. And, regarding the Pathloss for RN-UE in Table of FIG. 15, for the pathloss model used between RN and UE, a terrain type B is exploited as well, which is designed for suburban, where RN antenna is located above roof top (ART) described, for example, in Non-Patent Document 9 below.

Non-Patent Document 9

IEEE C802.16m-07/080r3, IEEE 802.16 Broadband Wireless Access Working Group, Aug. 28, 2007.

Regarding the Pathloss for eNB-UE in Table of FIG. 15, details are described, for example, in Non-Patent Document 10 below.

Non-Patent Document 10

3GPP TR 25.814 v7.0.0, Physical layer aspects for evolved UTRA, release-7, June 2006.

In the system level simulation, the relay node is considered to be located above roof top.

Figure 7:
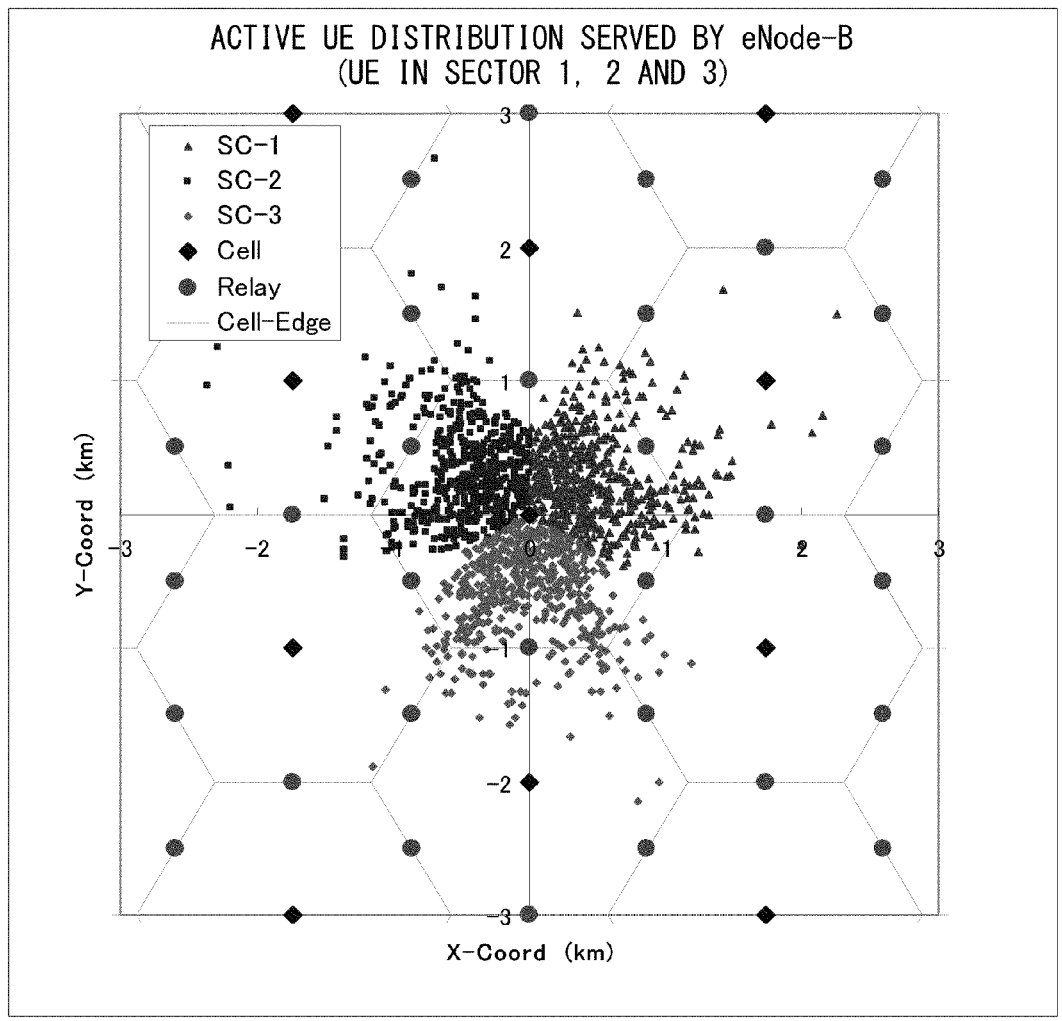
FIG. 7 is a diagram illustrating an example of UE distribution served by sector-1, sector-2, sector-3 in a central cell.

FIG. 7 illustrates an example of the UE distribution in the network. The UEs are served by sector-1, sector-2 and sector-3 in the centre cell. In this case, there is a RN involved in each sector. The decision whether a UE is served by eNode-B or RN is based on the received geometry compared between the geometry from eNode-B to UE and the geometry from RN to UE. In this case, the UE geometry from eNode-B is higher than that from RN.

Figure 8:
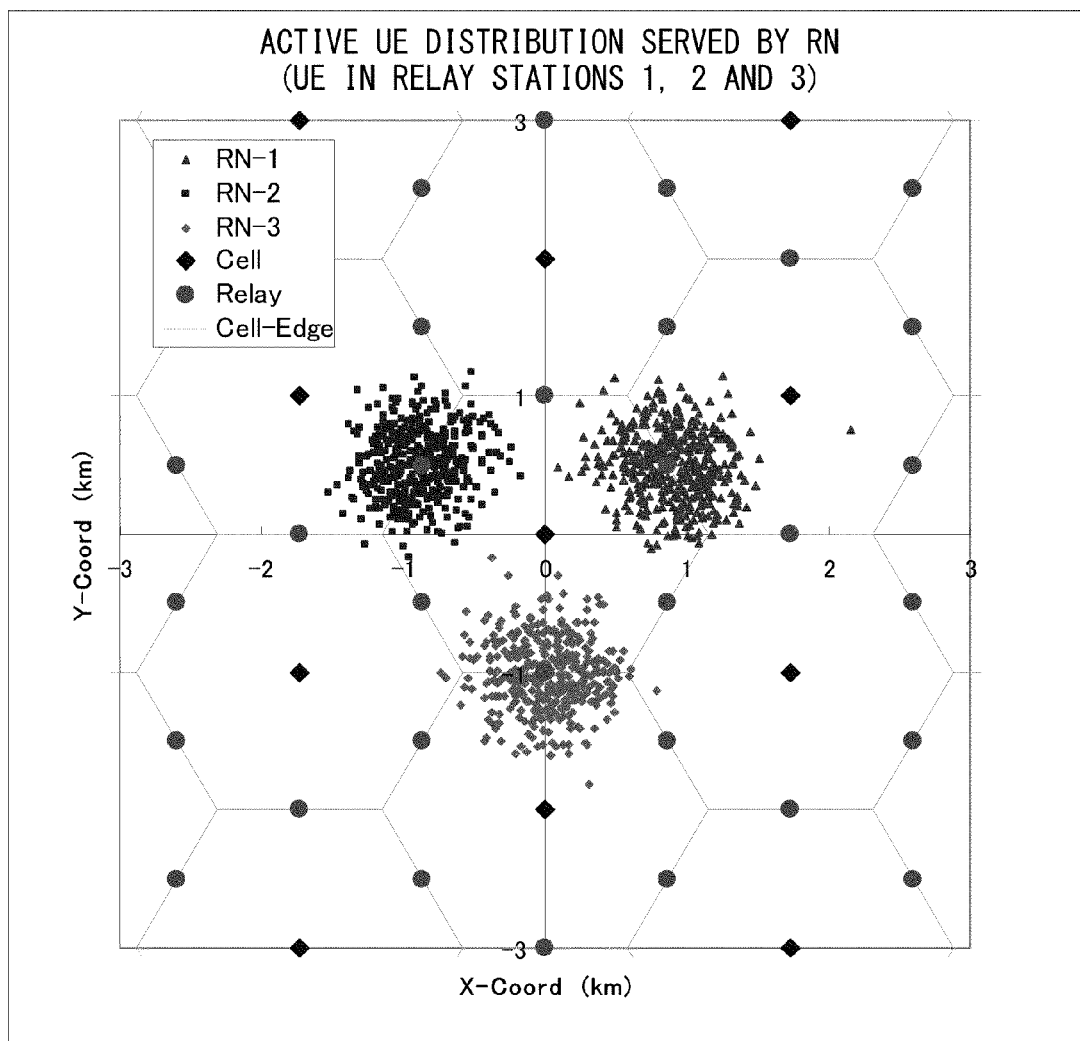
FIG. 8 is a diagram illustrating an example of UE distribution served by RN-1, RN-2 and RN-3 in a central cell located on rooftop.

FIG. 8 illustrates an example of the UE distribution in the network. The UEs are served by RN-1, RN-2 and RN-3 in the centre cell. In this case, there is a RN involved in each sector, and the UE geometry from RN is higher than that from eNode-B. It may be observed that eNode-B and RN individually serve their UEs in different areas with slight overlapping due to the long-term fading variation.

FIG. 9 presents an example of the CDF (Cumulative Density Function) of geometry (or long-term SINR) for the serving links, from eNode-B to all UE without relaying, from RN to UE1, from eNode-B to UE1, from eNode-B to UE0, and eNode-B to RN, respectively. It may be seen that after relaying, the reliability of the link from RN to UE1 becomes much better, and at lease 4 dB gain is achieved if compared to the link from eNode-B to RN, and a tremendous gain (more than 10 dB gain) is achieved if compared to the link from eNode-B to UE1. In addition, the link quality of eNode-B to UE0 is always better than the link quality of eNode-B to RN. This verifies that UE0 is able to detect and perform SIC process the packet transmitted from eNode-B to RN.

Figure 10:
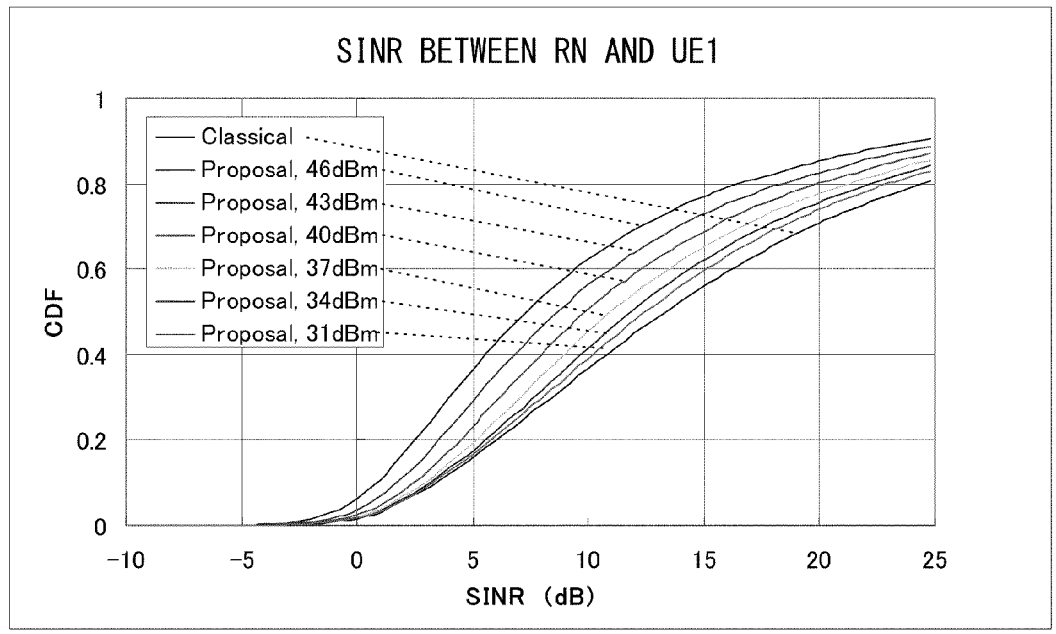
FIG. 10 is a diagram illustrating an example of CDF of geometry (long-term SINR) for a link from RN to UE1.

FIG. 10 illustrates the CDF of geometry for the link from RN to UE1. In this case, a power control is involved in the link from eNode-B to UE0. It may be seen that when the transmission power from eNode-B is reduced from 46 dBm to 31 dBm, the SINR for the link from RN to UE1 is gradually improved due to the interference reduction from eNode-Bs.

Figure 11:
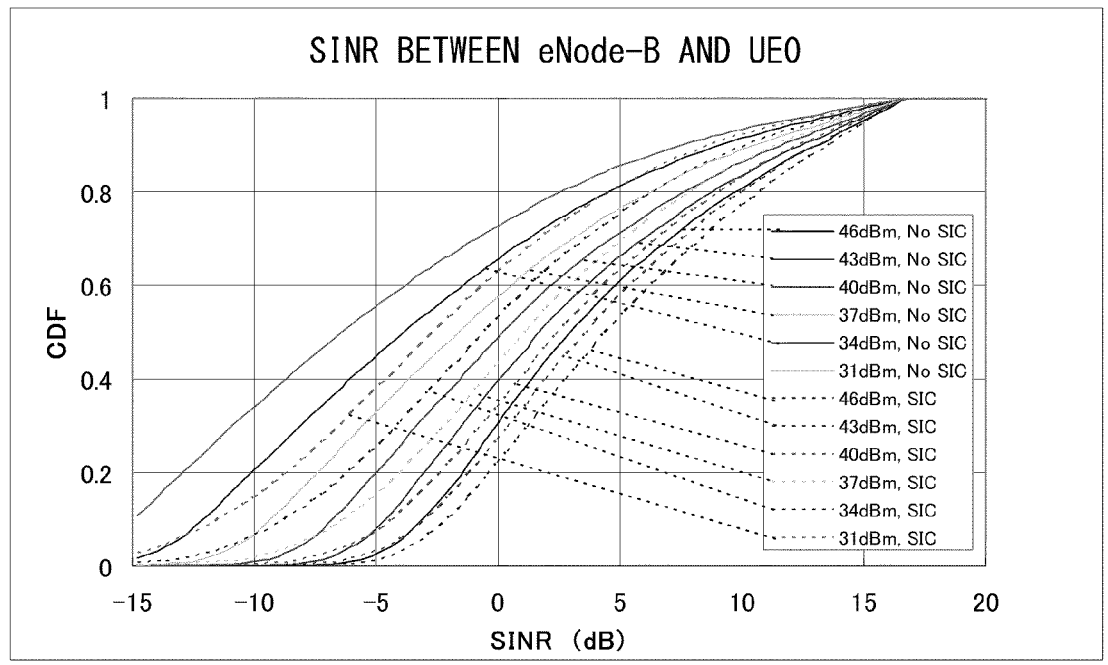
FIG. 11 is a diagram illustrating an example of CDF of geometry (long-term SINR) for a link from eNode-B to UE0 with and without SIC receiver.

FIG. 11 illustrates the impact of system performance for the link from eNode-B to UE0 by reducing the eNode-B transmission power. It may be observed that the proper transmission power for that link may be 40 dBm from eNode-B, which is 6 dB lower than the full power. Further reducing the transmission power could cause an intolerant degradation in Link-3 system performance. In addition, with 6 dB transmission power reduction, the SIC may give more than 2 dB SINR gain.

Figure 12:
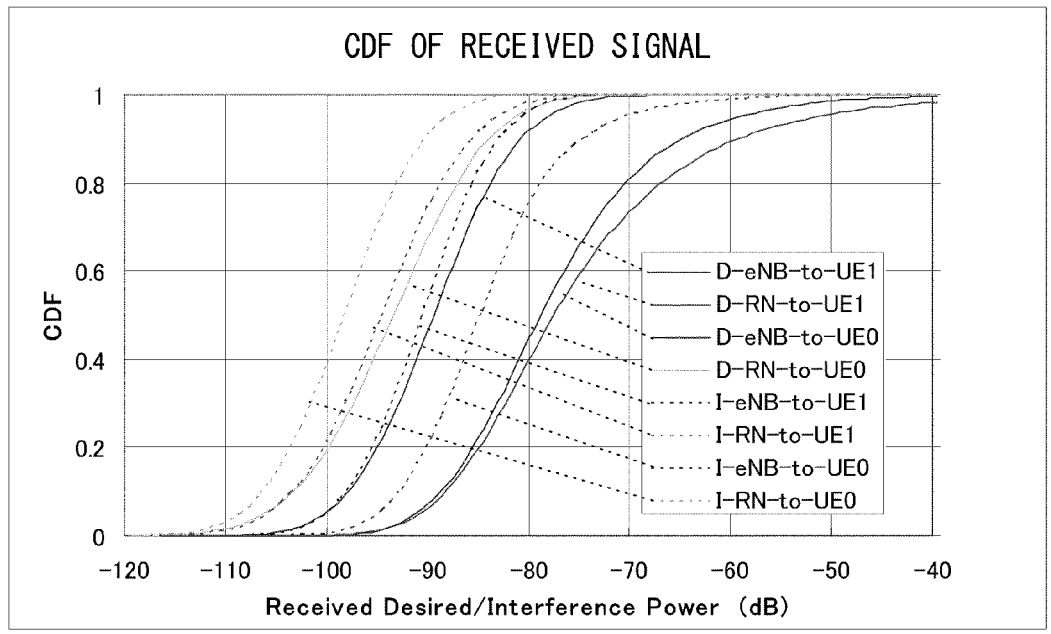
FIG. 12 is a diagram illustrating an example of CDF of received power by UE0 and UE1 including desired signal and interference from eNode-B and RNs.

FIG. 12 illustrates the CDF of received power by UE0 and UE1 including desired signals (solid lines) and interferences (dot lines) from eNode-B and RNs. In this case, no power control from eNode-B is involved. From the results, it may be seen that with full power transmission from eNode-B, the interference from eNode-B to UE0 denoted I-eNB-to-UE0 is quite large while the interference from RN to UE0 denoted D-RN-to-UE0 is small. This means that due to the power control, reducing the interference from eNode-B to UE0 is equivalent to reducing the desired power for the link from eNode-B to UE0 denoted D-eNB-to-UE0, resulting in a notable impact from the interference caused by the link of eNode-B-to-UE0.

In the embodiment described above, it is also possible to make the configuration so as to let the control channel of data transmitted from the eNode-B to the RN have scheduler information for transmitting relay data from the RN to the UE1.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments have been described in detail, it should be understood that the various changes, substitutions, and alterations could be made hereto without departing from the spirit and scope of the invention.

What is claimed is:

1. A radio communication system comprising:
   a first radio communication apparatus configured
       to transmit first data in a first phase using a first radio channel resource, and
       to transmit second data in a second phase using a second radio channel resource;
   a second radio communication apparatus configured
       to receive the first data from the first radio communication apparatus during the first phase,
       to generate relayed data, wherein the relayed data comprises the first data and
       to transmit the relayed data using the second radio channel resource during the second phase; and
   a third radio communication apparatus, wherein the third radio communication apparatus includes at least; a receiver, a controller, a first switch, a first demodulator, a first decoder, a buffer memory, a second switch, an encoder, a modulator, a canceler, a second demodulator, and a second decoder, wherein
       the controller is configured to decide whether a received signal is transmitted in the first phase or transmitted in the second phase,
       the first switch is configured to guide the received signal to the first demodulator when the received signal is transmitted in the first phase, and to guide the received signal to the canceller when the received signal is transmitted in the second phase,
       the first demodulator is configured to demodulate the received signal to generate a first demodulated signal,
       the first decoder is configured to decode the first demodulated signal to generate first decoded data,
       the buffer memory is configured to store the first decoded data,
       the second switch is configured to guide the first decoded data stored in the buffer memory to the encoder when the received signal is transmitted in the second phase,
       the encoder is configured to encode the first decoded data to generate re-encoded data,
       the modulator is configured to modulate the re-encoded data to generate a re-modulated signal,
       the canceller is configured to extract a target signal from the received signal transmitted in the second phase by subtracting the re-modulated signal from an output signal of the first switch,
       the second demodulator is configured to demodulate the extracted target signal to generate a second demodulated signal, and
       the second decoder is configured to decode the second demodulated signal to obtain the second data.

2. The radio communication system according to claim 1, wherein different channel resources are used in the first phase and the second phase.

3. The radio communication system according to claim 1, wherein transmission power of the second data is controlled when the first radio communication apparatus transmits the second data to the third communication apparatus, in the second phase.

4. The radio communication system according to claim 1, wherein
   the first data, the second data and the relayed data of the first data respectively include information data and control data, the control data including destination identification information specifying a destination radio communication apparatus; and
   the first radio communication apparatus, the second radio communication apparatus and the third communication apparatus respectively detect destination identification information in the control data included in received data, to determine whether or not to receive information data included in the received data.

5. The radio communication system according to claim 1, wherein
   transmission schedule information of the relayed data of the first data transmitted from the second radio communication apparatus to the third radio communication apparatus is included in control data of the first data transmitted from the first radio communication apparatus to the second radio communication apparatus in the first phase; and
   the second radio communication apparatus transmits the relayed data of the first data to the third radio communication apparatus based on the transmission schedule information.

6. A user equipment operated in a radio communication system, wherein the radio communication system includes:
   a base station configured
       to transmit first data in a first phase using a first channel resource and
       to transmit second data in a second phase using a second radio channel resource; and
   a relay station configured
       to receive the first data from the base station,
       to generate relayed data, wherein the relayed data comprises the first data and
       to transmit the relayed data using the second channel resource, and wherein the user equipment includes at least; a receiver, a controller, a first switch, a first demodulator, a first decoder, a buffer memory, a second switch, an encoder, a modulator, a canceler, a second demodulator and a second decoder, wherein
       the controller is configured to decide whether a received signal is transmitted in the first phase or transmitted in the second phase,
       the first switch is configured to guide the received signal to the first demodulator when the received signal is transmitted in the first phase, and to guide the received signal to the canceller when the received signal is transmitted in the second phase,
       the first demodulator is configured to demodulate the received signal to generate a first demodulated signal, the first decoder is configured to decode the first demodulated signal to generate first decoded data, the buffer memory is configured to store the first decoded data, the second switch is configured to guide the first decoded data stored in the buffer memory to the encoder when the received signal is transmitted in the second phase, the encoder is configured to encode the first decoded data to generate re-encoded data, the modulator is configured to modulate the re-encoded data to generate a re-modulated signal, the canceller is configured to extract a target signal from the received signal transmitted in the second phase by subtracting the re-modulated signal from an output signal of the first switch, the second demodulator is configured to demodulate the extracted target signal to generate a second demodulated signal, and the second decoder is configured to decode the second demodulated signal to obtain the second data.

\* \* \* \* \*